United States Patent
Adams

(10) Patent No.: US 10,035,530 B2
(45) Date of Patent: Jul. 31, 2018

(54) APPARATUS FOR TRANSPORTING VEHICLES

(71) Applicant: Jon Adams, Orange, CA (US)

(72) Inventor: Jon Adams, Orange, CA (US)

(*) Notice: Subject to any disclaimer, the term of this patent is extended or adjusted under 35 U.S.C. 154(b) by 0 days.

(21) Appl. No.: 15/367,173

(22) Filed: Dec. 1, 2016

(65) Prior Publication Data

US 2017/0259839 A1    Sep. 14, 2017

Related U.S. Application Data

(60) Provisional application No. 62/261,848, filed on Dec. 1, 2015.

(51) Int. Cl.
*B62B 5/00* (2006.01)

(52) U.S. Cl.
CPC ........ *B62B 5/0083* (2013.01); *B62B 2202/90* (2013.01); *B62B 2206/02* (2013.01); *B62B 2301/10* (2013.01)

(58) Field of Classification Search
CPC .................................................. B62B 5/0083
See application file for complete search history.

(56) References Cited

U.S. PATENT DOCUMENTS

| | | | |
|---|---|---|---|
| 4,761,984 A * | 8/1988 | Fuscaldo, Jr. | B21D 1/14 72/305 |
| 5,620,192 A * | 4/1997 | Demongin | B25H 1/0007 248/582 |
| 7,300,063 B1 * | 11/2007 | Prizmich | B62B 5/0083 280/47.15 |

* cited by examiner

*Primary Examiner* — John D Walters
*Assistant Examiner* — James J Triggs
(74) *Attorney, Agent, or Firm* — Gail Williams, Esq.

(57) ABSTRACT

An improved dolly particularly suited for the secure transport of disabled vehicles in a repair shop is described. Specifically, the locations of both the points of contact with the vehicle and the points of contact with the ground may be configured independently from one another. This configurability allows the dolly to contact the vehicle in the most optimally secure locations, while also contacting the floor in the most convenient configuration so as to accommodate obstructions and irregularities in the floor.

2 Claims, 6 Drawing Sheets

APPARATUS FOR TRANSPORTING VEHICLES

CROSS-REFERENCE TO RELATED APPLICATIONS

This application claims benefit of priority of U.S. Provisional Patent Application 62/261,848, filed Dec. 1, 2015, entitled "Method and apparatus for transporting vehicles", which is incorporated by reference herein in its entirety.

FIELD

This invention relates generally to automotive repair equipment and, more particularly, to a dolly for transporting vehicles or other workpieces under repair.

BACKGROUND

Many vehicles on the market employ cradle, subframe, or powertrain and suspension support systems. Various repair operations on vehicles require removing the front or the rear subframe entirely from the vehicle while it is raised off the ground by a lifting apparatus in a repair bay. Even in the case of vehicles which do not utilize these specific support systems, repair operations often require partial disassembly to the point where wheels and supporting structures are removed entirely from the body of the vehicle.

Once the vehicle is in this partially disassembled state, the vehicle cannot easily nor safely be moved off the lifting apparatus. In addition, a partially disassembled vehicle often cannot be safely placed upon a flat surface without the weight of the vehicle damaging the components which come in contact with the flat surface. Thus, the vehicle may be required to remain on the lift apparatus in the repair bay while repair operations on vehicle components are completed. During this time, the repair bay is occupied by the partially disassembled vehicle, and is unavailable for repair operations on other vehicles. If the repair is delayed, the repair bay remains unavailable for a prolonged period of time. This inconvenience deprives the repair shop of revenue and deprives the community of repair services, despite the availability of parts and labor to perform said repairs.

Accordingly, the prior art has attempted to provide a solution to these problems in the form of a vehicle mover or dolly which supports the disassembled vehicle so that it may be lowered from the lift and transported out of the repair bay for storage. One prior art device had the disabled vehicle rest on clevises on top of two connected dollies, each dolly supported by a pair swivel casters. Unfortunately, this solution does not safely secure the vehicle during transport, which risks injury both the the vehicle and to nearby people and property. Additionally, irregularities in the floor as well as physical obstruction created by the lifting apparatus makes lowering a vehicle safely onto this device's clevises difficult or impossible in many repair bays.

Another known device was a dolly that connected to the vehicle at four points of the vehicle frame in an attempt to provided added safety and stability while moving the vehicle. This dolly was also incompatible with many repair bay lift apparatuses due to floor irregularities and the obstruction of the lifting apparatus. Because of the four connection points, the dolly was cumbersome to lift and install; it could not permit the movement of a vehicle with both front and rear subframes removed unless eight attachment points were available on the vehicle.

Other attempts to solve the problem involved modifications to a hydraulic floor jack, either to more easily roll while lifting a vehicle, or to more securely attach to the vehicle to be moved. Known solutions have been unable to produce a dolly that can easily and securely receive and transport the disabled vehicle, due the challenges presented by limited available vehicle support points, floor irregularities and obstructions, and the arrangement of the repair bay lift apparatus itself.

SUMMARY

The present invention solves these problems with a configurable dolly, particularly useful in vehicle repair practices in which some or all of a vehicle's wheels have been removed. The dolly is configurable so the user can customize the location and number of vehicle attachment points as well as the location of and number of wheel assemblies present on the dolly frame. This configurability allows the dolly to attach to the vehicle in secure locations which do not interfere with the repair bay lift apparatus, while simultaneously allowing the dolly wheel assemblies to be placed in locations advantageous to navigate and avoid obstructions and irregularities on the floor. The dolly permits the wheel assemblies and the vehicle attachment points to be located centrally under the car, or peripherally under the car—or some combination—as best suits the particular vehicle and repair bay environment.

Multiple dollies may be used to move a disabled vehicle lacking both the front and rear subframe. The wheel assemblies and vehicle attachment points may be secured in place on the dolly frame relative to once another through the use of a variety of frame locks, if desired, once the ideal configuration has been determined. Particular embodiments may optionally allow configurability of the height of the vehicle attachment points, allowing the vehicle to travel over a low-lying obstacle while it is being transported. Particular embodiments may also optionally include the wheel assemblies and vehicle attachment points being positioned collinearly along an elongated frame.

BRIEF DESCRIPTION OF THE DRAWINGS

Like reference numerals refer to like elements throughout. Elements are not to scale unless otherwise noted.

DETAILED DESCRIPTION

Although specific embodiments of the present invention shall be described below with reference to the drawings in this application, such embodiments are only by way of example, and are simply illustrative of the many specific embodiments of the principles of the present invention.

Figure 1:
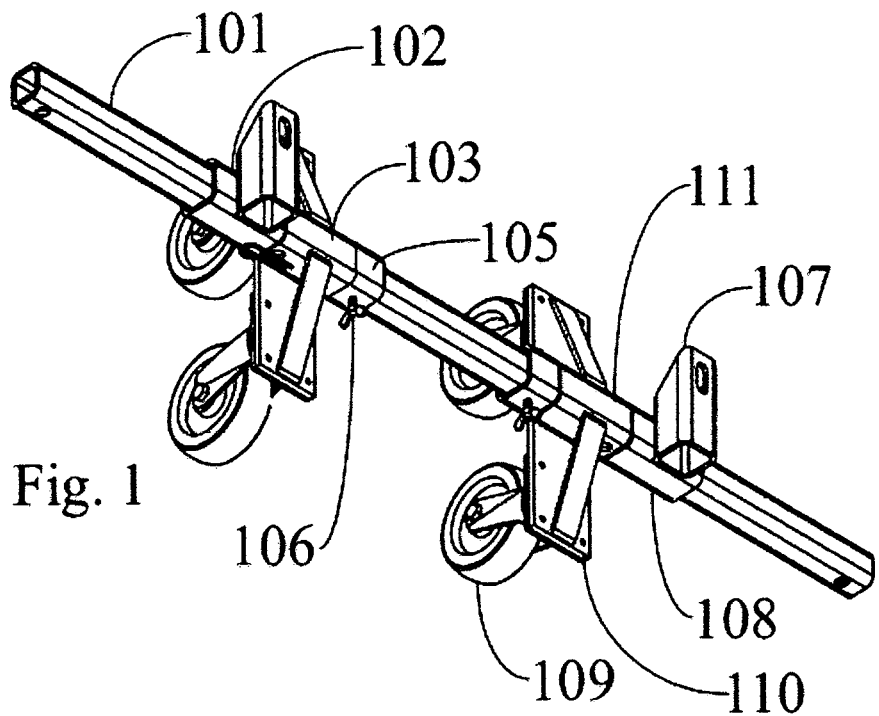
FIG. 1 is a perspective view image, showing a dolly according to present invention with vehicle attachment points configured peripherally relative to wheel assemblies on the dolly frame.
Figure 2:
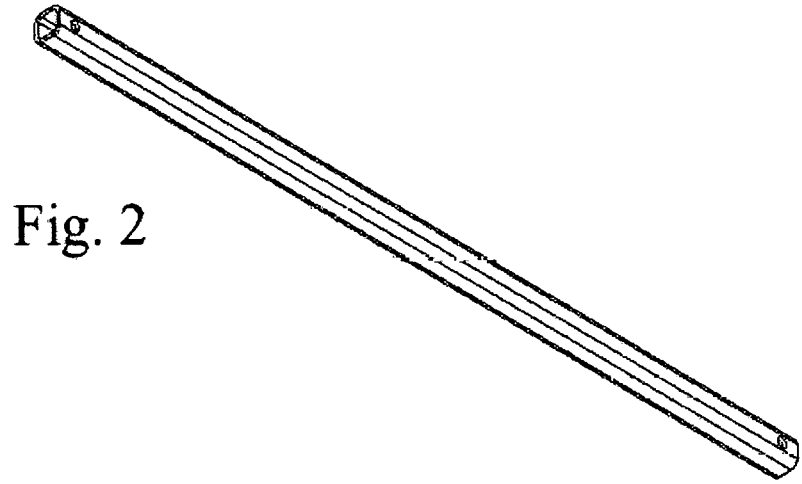
FIG. 2 is a perspective view image, showing a dolly frame that may be employed in the dolly of FIG. 1
Figure 3:
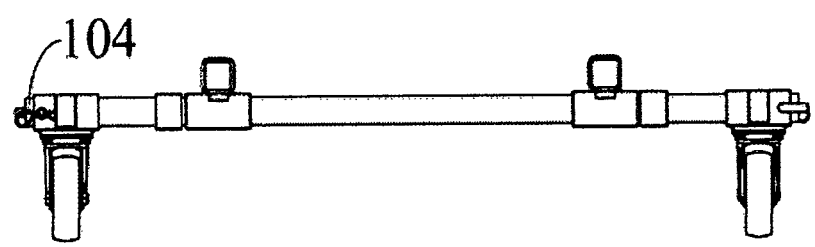
FIG. 3 is an elevation view image, showing a dolly according to present invention with the wheel assemblies configured peripherally relative to the vehicle attachment points along the dolly frame.
Figure 5:
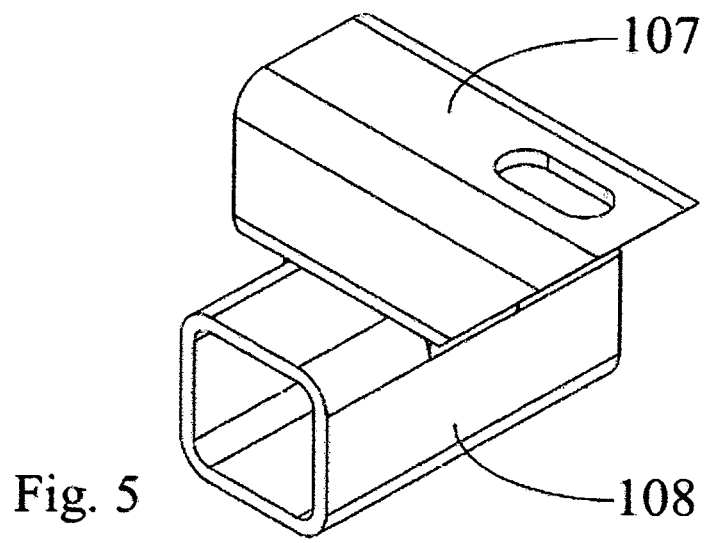
FIG. 5 is a perspective view image, showing a vehicle attachment point that may be employed in the dolly of FIG. 1.

FIG. 1 shows a perspective view of the invention in its assembled but uninstalled state. The Frame 101, is threaded through the other components of the invention to relate them physically and connect the vehicle attachment points 102 to the wheel assembly 103. The frame provides rigid support and may be variably made of square tubing or any other material providing both rigidity and support. The Vehicle attachment points 102 are comprised of a vehicle mount 107 that allows the frame to attache to any flat horizontal point on the underside of the vehicle with a vertically-facing hole (such as, but not limited to, the cradle mounting holes on a partially disassembled vehicle) affixed to a slide mount 108 which connects to the frame. The vehicle attachment point is detailed in FIG. 5. In one embodiment, the frame is a square tubular shape, and the slide mount and wheel assemblies are threaded onto the frame via holes of a slightly larger diameter. A sliding frame lock 105 may optionally be locked relative to the frame, for example by use of a frame lock wing bolt 106 being urged against the frame to hold wheel assemblies or vehicle attachment points in place once they have been optimally configured. A threaded frame lock 104, as detailed in FIG. 3, may hold the wheel assemblies or vehicle attachment points in place by passing through a hole in the frame, as with hitch pins and clips.

In some embodiments, the vehicle mount 107 can be varied using a taller shape that increases the height between the attachment of the slide mount to the frame and the attachment of the vehicle mount to the vehicle.

Figure 6:
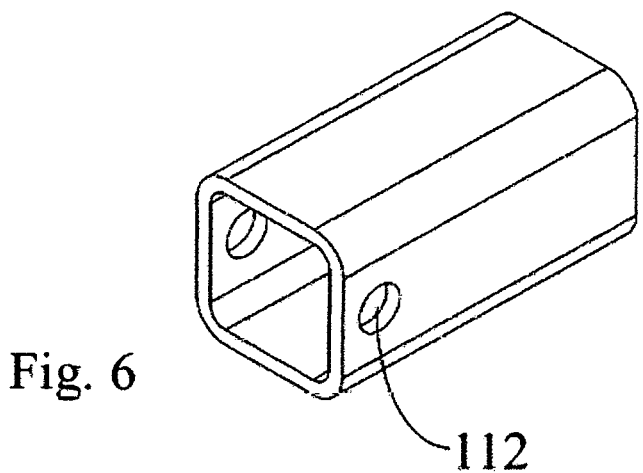
FIG. 6 is a perspective view image, showing a frame lock that may be employed in the dolly of FIG. 1
Figure 7:
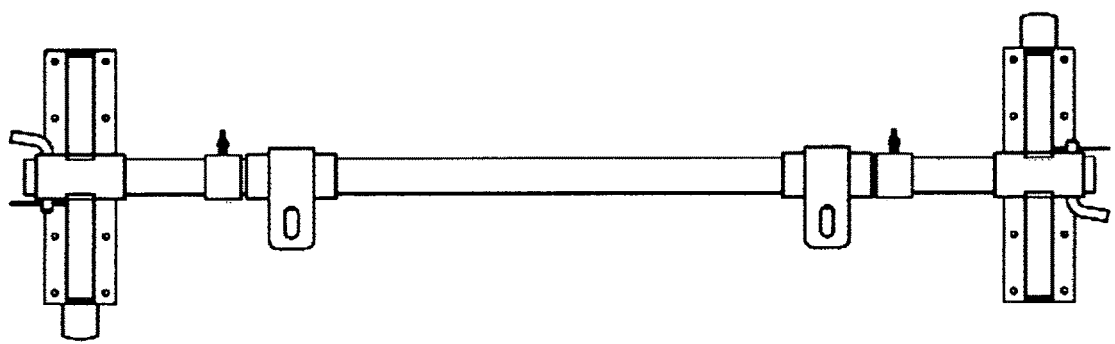
FIG. 7 is a plan view image of the dolly of FIG. 3.

In FIG. 6, a component of one embodiment of the invention, the frame lock, is shown in detail. The frame lock shows a frame lock hole 112, which may be used to secure the frame lock in place on the frame by the application of pressure on the frame through the hole, such as with a wing bolt.

Figure 8:
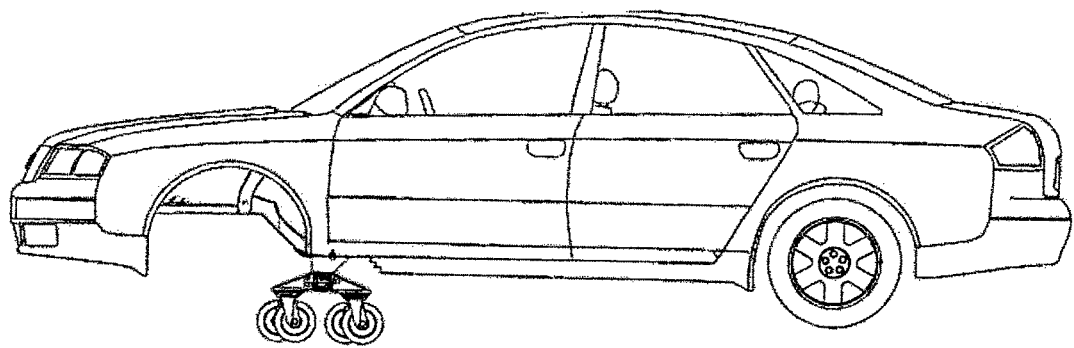
FIG. 8 is a plan view image, showing a dolly according to the present invention installed on a vehicle in place of the front wheels.
Figure 9:
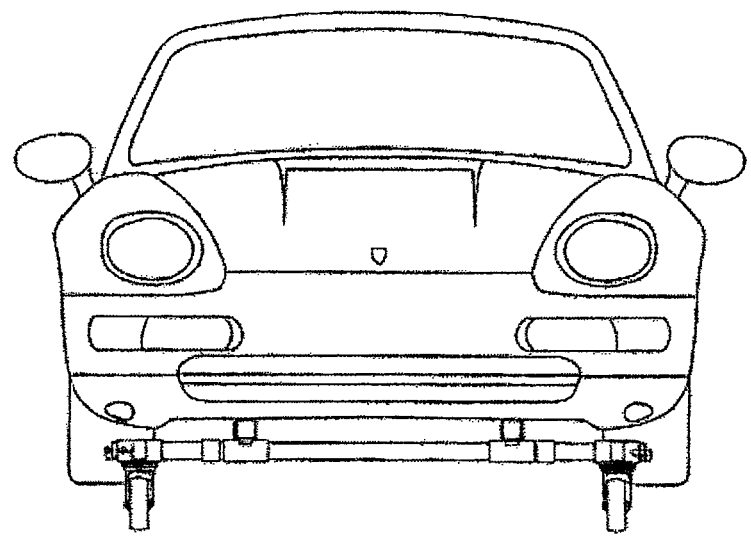
FIG. 9 is an elevation view image, showing a dolly according to the present invention installed on a vehicle in place of the front wheels, with the wheel assemblies configured peripherally relative to the vehicle attachment points along the dolly frame.
Figure 10:
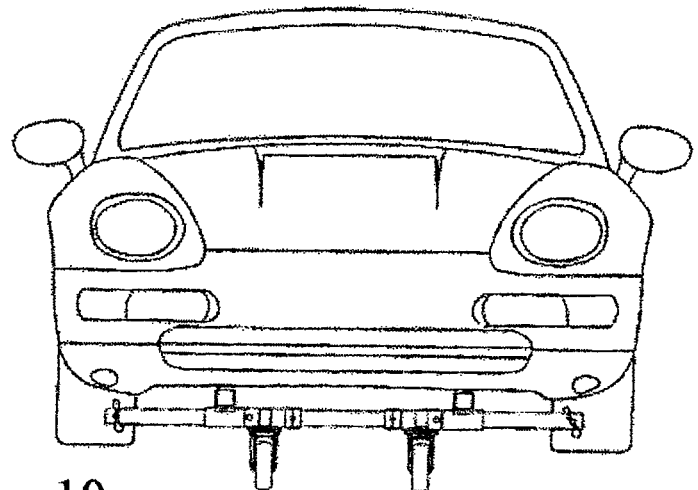
FIG. 10 is an elevation view mage, showing a dolly according to the present invention installed on a vehicle in place of the front wheels, with the vehicle attachment points configured peripherally relative to the wheel assemblies along the dolly frame.

FIGS. 8-10 shows various angles of one embodiment of the invention installed on a vehicle. In particular, FIGS. 9 and 10 show how the placement of the wheel assemblies and the vehicle attachment points may be varied relative to one another along the frame; FIG. 9 shows the vehicle attachment points placed centrally relative to the wheels along the frame; whereas FIG. 10 shows the vehicle attachment points arranged peripherally relative to the wheels along the frame.

Figure 4:
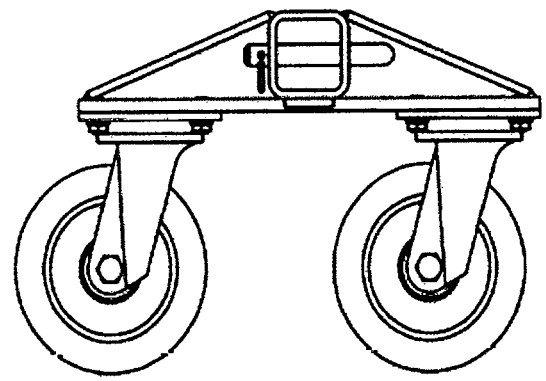
FIG. 4 is an elevation view image, showing a wheel assembly that may be employed in the dolly of FIG. 1.

FIG. 4 shows one embodiment of the wheel assembly. In this particular embodiment, the wheels are placed on either side of the wheel assembly's attachment to the frame, so as to provide a stable, balanced surface on which the frame can rest.

The invention claimed is:
1. A vehicle dolly comprising:
a. a rigid frame of an elongated shape;
b. one or more wheel assemblies, said wheel assemblies having an opening of a slightly larger diameter than said frame diameter;
c. said wheel assemblies being connectable to the frame by threading the opening onto the frame;
d. one or more vehicle attachment points, said vehicle attachment points having a frame attachment opening of a slightly larger diameter than said frame diameter;
e. said vehicle attachment points being connectable to the frame by threading the frame attachment opening onto the frame;
f. said vehicle attachment points and wheel assemblies being variably locatable along the frame, such that the vehicle attachment points and the wheel assemblies are optionally locatable on the periphery of the frame, or elsewhere along the frame.
2. The dolly of claim 1, further comprising:
a. one or more frame locks connectable to the frame;
b. wherein the frame locks engage with the frame so as to hold the vehicle mount points and the wheel assemblies stationery relative to one another along the frame.

* * * * *